United States Patent [19]

Heuser

[11] 4,305,385
[45] Dec. 15, 1981

[54] SOLAR COLLECTOR

[76] Inventor: Volkmar Heuser, Hauptstrasse 71, D-5429 Miehlen, Fed. Rep. of Germany

[21] Appl. No.: 50,165

[22] Filed: Jun. 20, 1979

[30] Foreign Application Priority Data

Jun. 23, 1978 [DE] Fed. Rep. of Germany ....... 2827986

[51] Int. Cl.³ ................................................. F24J 3/02
[52] U.S. Cl. ............................. 126/449; 126/DIG. 2; 126/448
[58] Field of Search ............... 126/432, 442, 446, 447, 126/449, 450, DIG. 2; 165/173–175; 29/157.4

[56] References Cited

U.S. PATENT DOCUMENTS

| | | | | |
|---|---|---|---|---|
| 3,792,729 | 2/1974 | Perry | ................................ | 165/175 |
| 4,076,076 | 2/1978 | Harrison | .............................. | 126/446 |
| 4,094,301 | 6/1978 | Sorenson et al. | ................... | 126/447 |
| 4,111,188 | 9/1978 | Murphy, Jr. | ......................... | 126/446 |
| 4,114,597 | 9/1978 | Erb | ...................................... | 126/450 |
| 4,144,874 | 3/1979 | Zebuhr | ................................ | 126/450 |
| 4,192,287 | 3/1980 | James | .................................. | 126/449 |
| 4,244,353 | 1/1981 | Straza | .................................. | 126/432 |

FOREIGN PATENT DOCUMENTS 2618827 11/1977 Fed. Rep. of Germany ...... 126/446
EP 9472 4/1980 Fed. Rep. of Germany ...... 126/449

Primary Examiner—James C. Yeung
Attorney, Agent, or Firm—Gifford, Van Ophem, Sheridan & Sprinkle

[57] ABSTRACT

Solar collector without outer glass isolation in the shape of a usual roof cover, especially a roof cover having undulations, comprising integral passageways on the lower side of the roof cover and spaced apart from each other, and crossing channels which can be connected to the passageways, especially by pressing connecting openings one upon the other.

12 Claims, 4 Drawing Figures

SOLAR COLLECTOR

BACKGROUND OF THE INVENTION

I. Field of the Invention

The invention relates generally to solar collectors and more particularly to solar collectors having a plurality of interlocking sections with heat conducting passageways formed integrally therewith.

II. Description of the Prior Art

Collectors usually consist of an insulated base plate, a transparent cover and the proper collector element placed in between them. The element is heated by the solar rays and cooled by a heat-carrier so that the useful heat can be brought to the user. Often water is used as the heat carrier and on a sunny day can be heated to the temperature of utility water. However, in central Europe there are many cloudy days, especially in Fall and Winter, in addition to which these days are shorter. In particular during these seasons the demand for heating is increased.

The invention comes from the realization that it is not necessary to achieve the maximum possible output from the solar collector during a sunny day. It is much more advantageous to waive the maximum output and on cloudy days remove the heat from the air as well.

This presupposes the use of heat pumps for creating a suitable temperature level. The solar collector should also be capable of not only adequately heating the heat carrier on sunny days but more importantly create a "reservoir" during cloudy days, whose temperature yet is not high enough for heating purposes or heating utility water, but from this reservoir enough heat can be pumped out, because (though not being a large mass for storing heat environal heat, for example from the air, can steadily enter therein.

The task which serves as the basis of the invention is to produce a solar collector which will provide a sufficiently warm heat-carrier on sunny days and on cloudy days such as in Fall and Winter, provide a heat reservoir that can be tapped by heat pumps to provide a suitable temperature level.

SUMMARY OF THE PRESENT INVENTION

The task set forth is resolved by giving the solar collector the external form and dimension of corrugated sheet metal or that of corrugated sheets of asbestos cement, which have piping channels running along the bottom in the area of at least one wave trough. The piping channels toward the ends are jointed together through a cross-pipe which is respectively joined to the inlet or outlet for the heat-carrier.

The solar collector corresponding to the invention is very suitable to the usual form of a house roof, so that it will not disturb the overall appearance when installed, as often is the case with the flat collectors having glass covering. A further advantage is that the installation cost is significantly lower than that of the flat collector. Rust-proof tin, high grade steel, copper and above all, aluminum can be used as materials for the new solar collector. The surface of the solar collector is painted black, although there are also gray and shades of brown that are used in accordance with architectural tastes.

The connection between the cross-pipe and the piping channel can be a welded joint, although a screw-connection appears to present fewer complications. For this purpose, the piping channels and the cross-pipe are separated each by a flat wall which has as an intermediate layer, a gasket pressed against it and in the region of the intersection is provided with a connecting bore.

When aluminum is used for the corrugated plates, they consist of strip members which have interlocking devices for assembly with adjacent members, whereby the cross pipe is constructed to reinforce the corrugated plates. In this way, the piping channels can be produced by extrusion simultaneously with the roofing material as a section.

Aluminum could be extruded into a beam whose width would correspond to two waves of the standardized asbestos corrugated plates. However, the manufacture of a one wave strip member individual plate is simpler and a corrugated plate having an odd number of waves also can be put together. According to one embodiment of the invention, each strip member includes one wave of the corrugated plate assembly yet having an overlapping region to neighboring strips, i.e. begins or ends a given length before the wave-crest. The overlap regions are therefore constructed in such a way as to form a shingle like overlap oriented toward a wave-trough, thus allowing for proper run-off of rain. The width of the overlap region can be in the range of $\pi/9$ to $\pi/4$ of the given wave length, this means that each strip member ends approximately 40 mm short of the wave-crest and the neighboring strip member begins approximately 20 mm after the wave-crest.

The locking mechanism consists of a first hook located on the under-side of the overlapping region approximately 20 mm from the lengthwise edge and another hook on the overlapped region. The hooks latch together and couple the neighboring strip members. The overlapped region can have a lengthwise slot on its top side which can serve either as drainage for atmospheric moisture or a recess for sealing compound or as a slot for interlocking with an extension of the overlapping region of the neighboring strip member.

It is advantageous if the components of the locking mechanism of the assembly are engaged under a certain bias so that the surfaces pressed together will guarantee watertightness and in addition will prevent any rattling noises. For this purpose, the interlocked strip members form in the direction of the wave an arched plate which is drawn into a flat plane by the cross-pipes the lengthwise edges of one strip member being pressed against the top side of the neighboring strip member.

In order to obtain the standard size of an asbestos-cement corrugated plate, six strip members are combined into a corrugated plate assembly. The strip members consist preferably of extruded aluminum.

BRIEF DESCRIPTION OF THE DRAWING

An embodiment of the invention will be described with the following drawings in hand wherein, FIG. 1 Is a side plan view of a section of a strip member of the solar collector showing the piping channel secured thereto.

FIG. 3 is a fragmentary, broken sectional view taken substantially along line III—III in FIG. 1 showing the area around the tubular channels

DETAILED DESCRIPTION OF THE PRESENT INVENTION

Figure 1:
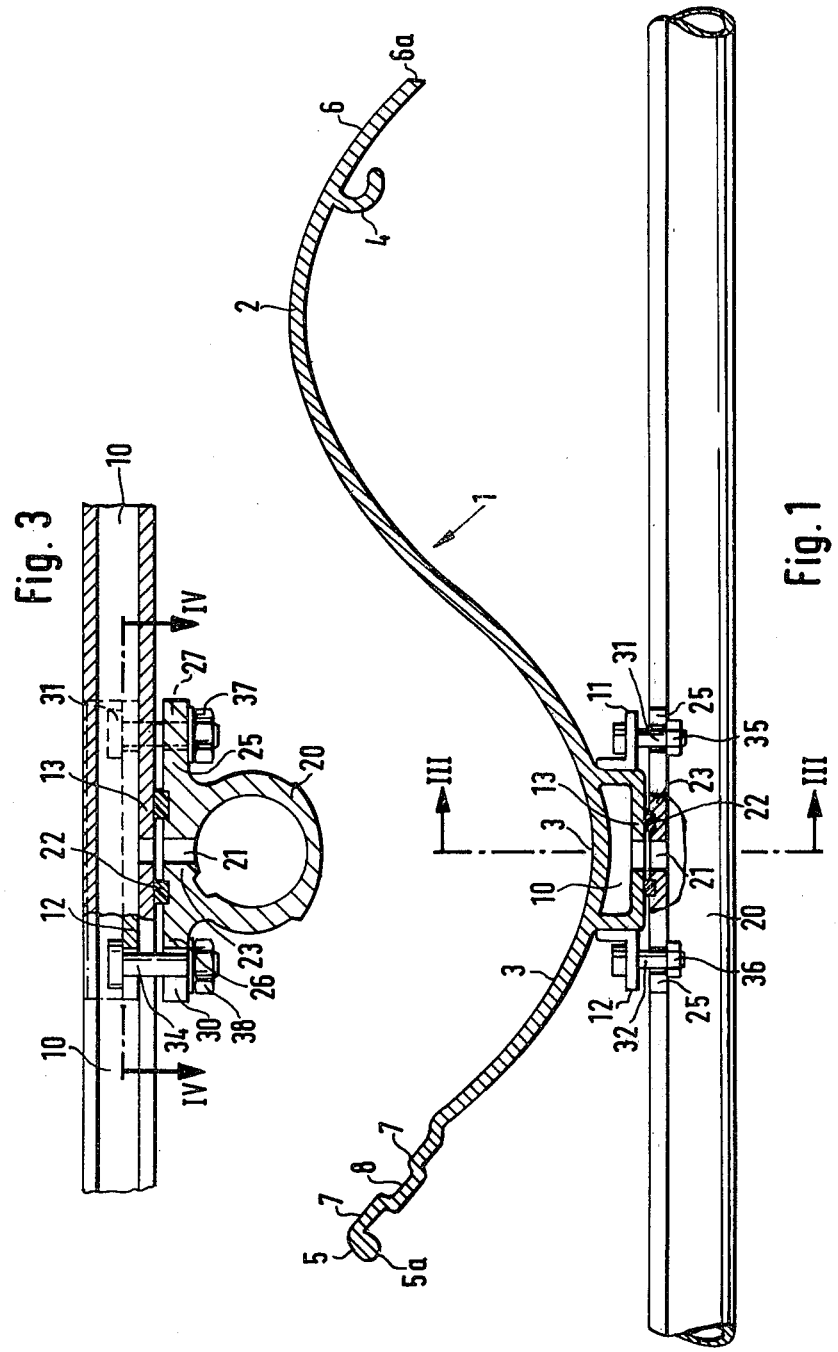
Figure 2:
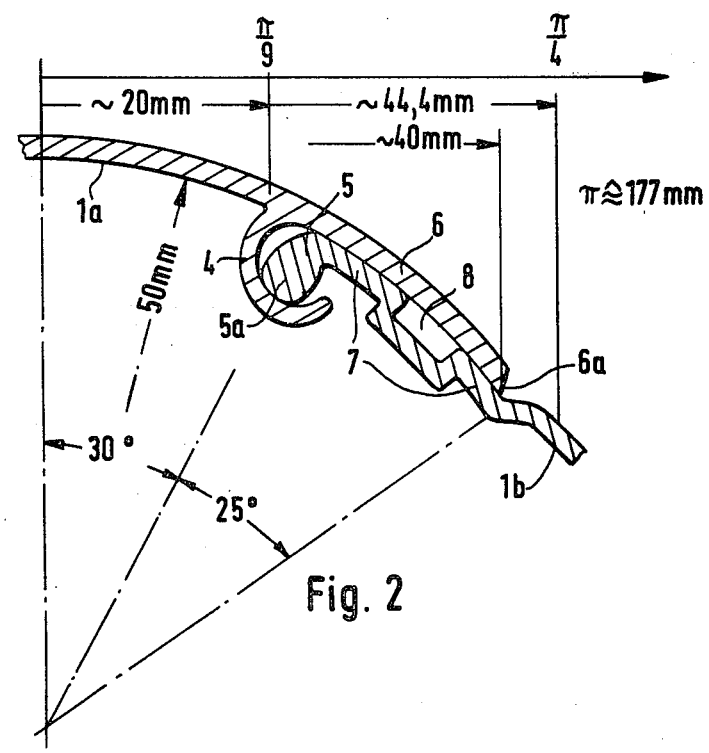
FIG. 2 is an enlarged fragmentary view of the strip member shown in FIG. 1 illustrating the interlocking means connecting to an adjacent strip member

The solar collector according to the invention has the external shape and dimension of corrugated metal or asbestos-cement corrugated plate, that is, the upper side displays wave crests and troughs inclined along the roof. In order to make the solar collector out of aluminum, it must be subdivided into individual strip member or elements as shown in FIG. 1. Each element (1) contains a wave crest (2) and a wave trough (3). The lengthwise edges are constructed like an interlocking mechanism i.e. a receiving hook (4) and an engaging hook (5) are provided whose interaction is shown in FIG. 2. The receiving hook (4) is oriented approximately at a 30° central angle on the under side of member (1) which (beyond hook 5) has an overlapping strip region (6). Near the engaging hook 5, therefore an overlapped region (7) is provided having a groove (8) running along its length. The overlapping region (6) or the overlapped region (7) respectively, is provided with an arc length of 25°. The lengthwise groove (8) is located approximately 45° of arc away from the top of the wave.

Referring again to FIG. 1, a tubular channel (10) runs along the underside of the wave trough (3). The channel is bounded from below by a flat wall (13) and has an inner width of 24 mm. and an inner height of 0.5 to 6 mm. Its ends, for example, are sealed by welded stoppers. Near the ends of the tubular channel (10), flanges (11) and (12) are welded which serve to fasten a cross pipe (20). The cross-pipe (20) has a flat wall (23) which is pressed against the wall (13) of the channel (10). In the area of this cross-like intersection a connecting passage (21) is provided, which goes through both the tubular channel (10) as well as the cross pipe (20) and in this way provides for a flow path for the heat-carrier of the solar-collector. A ring-joint (22) is installed around the passage (21) and provides a water-tight seal from the outside-in.

FIG. 2 shows how the lengthwise edge of two components (1a) and (b) interlock. The hooks (4) and (5) and the overlapping regions (6) and (7) are measured off in such a way so that the finished assembly forms a support with the lateral edge (6a) or edge of the hook (5a) respectively. As long as the strip members (1) are loosely fitted together, they do not lie on one plane but on a cylinder jacket with a large diameter and along with the fastening fixture on the cross-pipe, will be drawn into the common plate plane. At the interlocking region of the adjoining members (1), a certain bracing is incorporated, whereby fluttering of the edges can be avoided. The groove (8) which runs along the inclination of the roof, serves to drain water which can move up through the gap between both overlapping corrugated elements (6) and (7). It is also possible to install a sealing strip or inject a sealing component into the groove (8). Finally, the groove (8) can also serve as an engaging component of a locking cam which can be installed on the underside of the overlapping region (6) but is not shown in the diagram.

Figure 4:
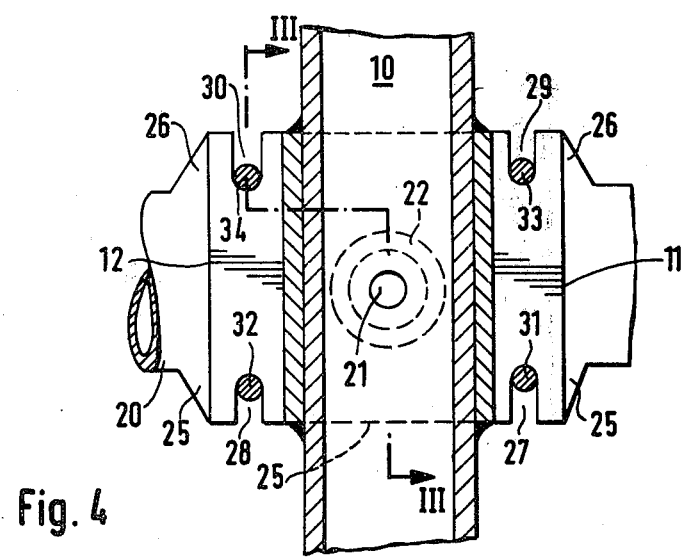
FIG. 4 is a sectional view taken substantially along line IV—IV of FIG. 3.

FIGS. 3 and 4 show a possible type of connection between the cross-pipe (20) and the tubular channel (10). As seen, the cross-pipe (20) is constructed as an extrusion part and is equipped with flanges (25) and (26) in which slots (27), (28), (29) and (30) are provided for bolts (31) to (34). The bolts are mounted into a corresponding slot of the welded flange (11) or (12) respectively and are secured by nuts (35) to (38).

The wall-thickness of the corrugated components are 1.5 mm if aluminum is used. Also, it has an external coat of paint, a dark lacquer if possible, in order to more effectively absorb the sun's rays. However, on the basis of architectural reasons, the coat of paint may be changed to gray or brown.

Two cross-pipes (20) are provided for each solar collector. The top cross-pipe runs to the end of the tubular channel (10) and serves to drain the heat medium while the lower cross-pipe runs to approximately 150 mm short of the end of the solar collector and serves to feed the heat medium. It must be understood, that the tubular channels (10) on their ends are installed with stoppers glued or welded on the ends. Also, the cross-pipes above the corresponding hoses are connected to the inlet and outlet system of the heating medium.

The cross-pipe can have a rectangular cross section with dimensions of 30 mm by 20 mm for example. Instead of fastening by means of bolts which engage into the flange of the cross-pipe, it is also possible to use tension bands buckles and the like.

It is also possible to use a synthetic material for the roofing and tubular channels that are integrally connected to it, the number of channels per layer will be increased. Since the corrugation of asbestos-cement has a wave length of 177 mm, the external form and dimension will be smaller when synthetic material is used. There are external forms and dimensions of normal roof materials in which the tubular channels can be made with smaller clearance in comparison to the clearance of 177 mm of the corrugated plates. Compared with the channel width, the clearance between neighboring channels should be relatively large.

We claim:

1. A solar collector comprising a sinuous roofing sheet, said sheet having a fluid passage means for carrying a fluid heat-carrier, wherein said fluid passage means comprises a plurality of longitudinally extending tubular channels integrally formed on the lower surface of said roofing sheet, beneath each trough of said sheet each channel being spaced apart from its adjacent channels by a distance substantially greater than the channel width, a cross pipe extending laterally across said channels adjacent each end of the roofing sheet, means for attaching said roofing sheet to said cross pipes, means for fluidly connecting said cross pipes to said tubular channels whereby one cross pipe forms an inlet for the fluid heat carrier, and wherein the tubular channels and the cross pipes each include at least one flat wall portion at their connection which abut against each other, each flat wall portion including a connecting bore and further comprising sealing means disposed around registering connecting bores when said flat wall portions abut each other.

2. A solar collector as defined in claim 1 wherein said roofing sheet comprises a plurality of elongated strip members having interlocking means along their lengths for connecting adjacent strip members together.

3. A solar collector as defined in claim 2 and having the external form and dimension of a corrugated plate and wherein each strip member forms substantially one wave of the corrugated plate and includes a specific overlap portion, said overlap portion substantially extending to the beginning or ending respectively of a wave crest.

4. A solar collector as defined in claim 3 wherein the length of the overlap portion is $\pi/9$ to $\pi/4$ of the wave length.

5. A solar collector as defined in claim 2 wherein each strip member includes an overlapped portion at a first end and an overlapping portion at the second end and wherein each interlocking means comprises a receiving hook on the under side of each strip member spaced from the lengthwise edge of said overlapping portion and an engaging hook on the overlapped portion, whereby the receiving hook engages the engaging hook of a first adjacent strip member and said engaging hook engages a receiving hook of a second adjacent strip member.

6. A solar collector as defined in claim 5 wherein said overlapped portion includes an elongated lengthwise groove.

7. A solar collector as defined in claim 2 wherein the engaging strip members are resiliently biased, whereby when connected together, they form an arched plate, said arched plate being straightened when secured to said cross-pipes and thereby causing the lengthwise edges of the strip members to be pressed upon the surface of the adjacent strip member.

8. A solar collector as defined in claim 2 comprising six wave-shaped strip members combined into one corrugated plate assembly which has the dimensions of standard corrugated sheet materials for roofs.

9. A solar collector as defined in claim 2 wherein each strip member is made of extruded aluminum and includes a coat of paint.

10. The invention as defined in claim 2 wherein said roof is inclined and wherein the longitudinal axis of said strip members extend in the direction of inclination of the roof.

11. For use with a building having a roof, a solar collector comprising:
a roofing sheet comprising a plurality of elongated strip members, each strip member being in the shape of a single wave in cross section, each strip member beginning and terminating at a point intermediate the crest and trough of the wave shape,
means formed along the longitudinal edges of each strip member for locking adjacent strip members together,
said locking means comprising a hook member integrally formed along one edge of each strip member and a receiving groove for said hook integrally formed along the opposite edge of each strip member,
fluid passage means formed longitudinally along the trough portion of each strip member for carrying a fluid heat carrier,
a cross pipe secured laterally across said roofing sheet adjacent each end, and
means for fluidly connecting said fluid passage means to said cross pipes whereby one cross pipe forms an inlet while the other cross pipe forms an outlet.

12. The invention as defined in claim 11 and further comprising means for tensioning adjacent attached strip members laterally outwardly from each other.

* * * * *

UNITED STATES PATENT AND TRADEMARK OFFICE
CERTIFICATE OF CORRECTION

PATENT NO. : 4,305,385
DATED : December 15, 1981
INVENTOR(S) : Volkmar Heuser

It is certified that error appears in the above—identified patent and that said Letters Patent is hereby corrected as shown below:

Column 1, line 35, after "heat"(first occurrence) insert --)--.
Column 3, line 42, delete "(b)" and insert -- (1b) --.

Signed and Sealed this

Twenty-seventh Day of April 1982

[SEAL]

Attest:

GERALD J. MOSSINGHOFF

Attesting Officer    Commissioner of Patents and Trademarks